UNITED STATES PATENT OFFICE.

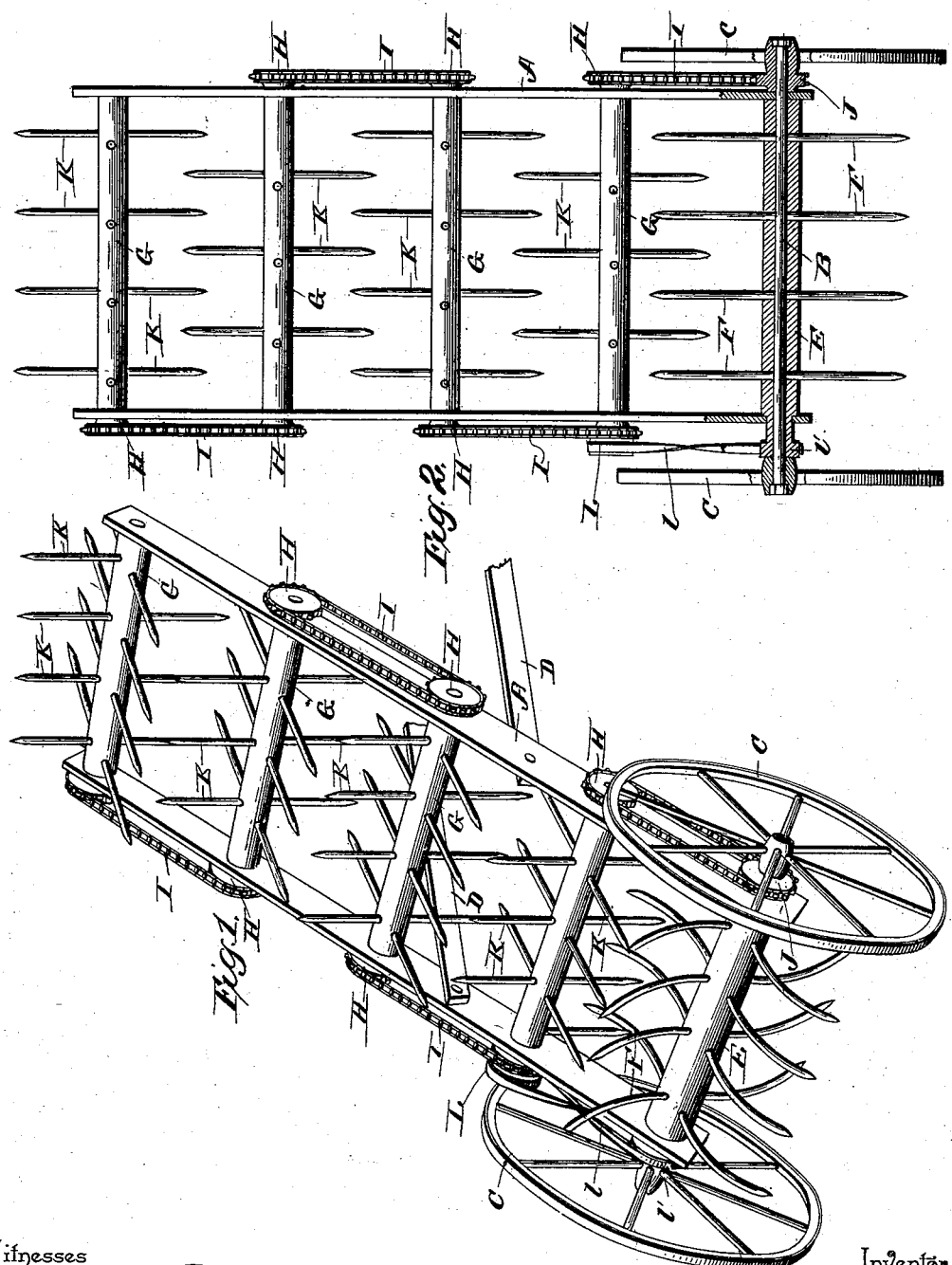

JESSE DRAKE, OF JACKSON, MISSISSIPPI.

HAY-LOADER.

SPECIFICATION forming part of Letters Patent No. 506,677, dated October 17, 1893.

Application filed February 24, 1893. Serial No. 463,557. (No model.)

*To all whom it may concern:*

Be it known that I, JESSE DRAKE, a citizen of the United States, residing at Jackson, in the county of Hinds and State of Mississippi, have invented a new and useful Hay-Loader, of which the following is a specification.

This invention relates to hay loaders; and it has for its object to provide an improvement in that class of hay loaders which are attached to the moving hay wagons and at the same time rake up the hay and elevate it into the wagon.

To this end the main and primary object of the invention is to provide an improved hay loader which will avoid the necessity of previously raking the hay up into rows, and shall be so constructed as to take up the hay from the front of the same as it is in motion, so as to prevent the hay falling off at the back end of the loader as is ordinarily the case, and thus adapting the machine for loading hay onto the wagon immediately after mowing.

With these and many other objects in view which will readily appear as the nature of the invention is better understood the same consists in the novel construction, combination and arrangement of parts hereinafter more fully described, illustrated and claimed.

In the accompanying drawings:—Figure 1 is a perspective view of a hay loader constructed in accordance with my invention. Fig. 2 is a vertical transverse sectional view of the same, taken through the axle.

Referring to the accompanying drawings, A represents a rectangular frame carrying at its lower end the supporting wheel axle B, on the ends of which are mounted the wheels C, which support the same for movement over the ground together with the hay wagon, to the rear end of which the loader is attached by means of the usual attaching arms or bars D secured to the opposite sides of the loader frame A.

Loosely mounted on the wheel axle B, is the lower rake roller E, which roller carries a radial series of spring rake teeth F, of the ordinary construction and preferably slightly curved, so as to secure a perfect hold on the hay being raked up. The lower rake roller E, is designed to be turned, as the loader is in motion, in a direction opposite to the rotation of the wheels and the wheel axle, so that the teeth of said roller will rake up the hay in front of the loader, as it advances, instead of around the rear lower end of the same, as in the ordinary loaders in use.

By having the rake roller rake up the hay in front of the loader, it will be seen that there is no possibility of any hay falling off at the lower rear end of the roller which has been raked up behind the same, which quite generally occurs in most loaders.

The loader frame A, is of course set at an angle from the ground, as usual, in order to elevate the hay onto the hay wagon, and in order to provide for carrying the hay from the lower rake roller up over the upper end of the loader and into the hay wagon, I employ a parallel series of elevating or carrier rollers G. The several elevating rollers G, have their opposite bearing ends journaled in opposite sides of the frame A, and carry upon one of their bearing or journal ends the sprocket or chain wheels H, which receive endless sprocket chains I, passing continuously over said wheels and one of which passes over the drive sprocket J, secured to one of the wheels C. This gearing of the several elevating rollers, provides means for simultaneously turning the same in one direction, toward the upper end of the frame, and in a direction opposite to the rotation of the rake roller E. The several elevating rollers are regularly spaced a suitable distance apart and are provided with a radial series of elongated elevating or lifting teeth K, which work between the teeth of the adjacent rollers, so that the spaces between the teeth of one roller are filled by the ends of the teeth of the adjacent roller, so that the hay being elevated by the entire series of rollers cannot easily fall therebetween and onto the ground.

In order to provide for rotating the rake roller E, in a direction opposite to the rotation of the elevating rollers, I may provide the first elevating roller next to the rake roller with a wheel L, at one end thereof, which receives the crossed belt $l$, passing over a wheel $l'$, at one end of the rake roller, although it will be understood that other means could be employed for securing the desired rotation of the rake roller.

Now it is thought that it will be apparent, that, as the hay wagon is put in motion and the several toothed rollers of the hay loader turned in the directions indicated, the roller rake will catch up the hay from the ground and lift it between the same and the first elevating roller. The first elevating roller turning in a direction opposite to the roller rake, necessarily removes the hay from the teeth of the roller rake and throws it onto the next higher succeeding roller. The rotation of the elevating rollers being the same, the hay is thrown in succession from one roller to another until it is finally thrown over the upper end of the roller frame and onto the hay wagon, and as before stated, the teeth of the several rollers being out of alignment with each other provide means for preventing any appreciable waste of hay by falling through the loader.

Although I have specifically stated the herein described devices as especially adapted for use as a hay loader, nevertheless it will be clear to those skilled in the art that the construction set up is equally available for use in other relations where the ordinary endless aprons or carriers are employed, such as in connection with binders, thrashers, and other agricultural machines, and may therefore be used for elevating and carrying purposes generally.

Changes in the form, proportion and the minor details of construction as embraced within the scope of the appended claim, may be resorted to without departing from the principle or sacrificing any of the advantages of this invention.

Having thus described my invention, what I claim, and desire to secure by Letters Patent, is—

In a machine of the class described, the combination with an open inclined wheeled frame; of a roller rake journaled in the lower end of said frame and adapted to turn in one direction, said roller rake being provided with a radial series of curved spring rake teeth, a series of elevating rollers journaled in said frame in a line with and above the roller rake and spaced regular distances apart, said elevating rollers being provided with radial series of elongated elevating or lifting teeth, the teeth of one roller being out of alignment with the teeth of the adjacent rollers so as to alternate therewith and fill up the spaces between the rollers, the lower one of said rollers being adapted to receive the raked material from the roller rake, and gearing connecting the rollers together, substantially as set forth.

In testimony that I claim the foregoing as my own I have hereto affixed my signature in the presence of two witnesses.

JESSE DRAKE.

Witnesses:
SAMUEL LIVINGSTON,
C. L. GASTON.